United States Patent
Spencer et al.

(10) Patent No.: US 6,450,452 B1
(45) Date of Patent: Sep. 17, 2002

(54) FLY BACK BOOSTER

(75) Inventors: Robert B. Spencer, Denver, CO (US); Thomas D. Megna, Littleton, CO (US); James R. Greenwood, Littleton, CO (US); Daniel J. Laintz, Denver, CO (US)

(73) Assignee: Lockheed Martin Corporation, Bethesda, MD (US)

( * ) Notice: Subject to any disclaimer, the term of this patent is extended or adjusted under 35 U.S.C. 154(b) by 0 days.

(21) Appl. No.: 09/578,321

(22) Filed: May 24, 2000

Related U.S. Application Data (60) Provisional application No. 60/135,556, filed on May 24, 1999.

(51) Int. Cl.⁷ .................................................. B64G 1/00
(52) U.S. Cl. .................. 244/158 R; 244/190; 244/172; 244/63
(58) Field of Search ..................... 244/158 R, 190, 244/172, 2, 63

(56) References Cited

U.S. PATENT DOCUMENTS

| 4,830,314 A | 5/1989 | Hujsak ....................... 244/172 |
| 4,884,770 A | 12/1989 | Martin ........................ 244/158 |
| 5,626,310 A | 5/1997 | Kelly ............................. 244/2 |
| 5,716,032 A | * 2/1998 | McIngvale ................... 244/190 |
| 5,779,190 A | * 7/1998 | Rambo et al. ............... 244/190 |
| 5,927,653 A | 7/1999 | Mueller et al. ............. 244/172 |
| 6,036,144 A | 3/2000 | Sisk ............................. 244/172 |
| 6,086,020 A | 7/2000 | Machiussi .................... 244/158 |
| 6,113,032 A | * 9/2000 | Cochran et al. ............. 244/172 |
| 6,193,187 B1 | 2/2001 | Scott et al. ..................... 244/2 |

* cited by examiner

*Primary Examiner*—J. Woodrow Eldred
(74) *Attorney, Agent, or Firm*—Marsh Fischmann & Breyfogle LLP (57) ABSTRACT

A reusable first stage (100) includes a booster engine system (102) for providing thrust during launch, a structural assembly (108), canards (118), jet engines (122), wings (124), elevons (126) and retractable landing gear (130). After separation, the jet engines (122) and aerodynamic control surfaces are used to return the first stage to a landing strip. The booster system (102) includes a structurally stable outer skin system such as an isogrid structure. The first stage (100) is thereby adapted for controlled descent and recovery with minimal structural enhancement or added mass.

19 Claims, 6 Drawing Sheets

FLY BACK BOOSTER

RELATED APPLICATIONS INFORMATION

This application claims priority from United States provisional patent application No. 60/135,556 entitled "Fly Back Booster," filed May 24, 1999, which is incorporated herein by reference.

FIELD OF THE INVENTION

The present invention relates in general to reusable launch vehicle systems and, in particular, to a booster or launch vehicle stage that can be recovered after use by controlled aerodynamic descent to a landing area.

BACKGROUND OF THE INVENTION

The space industry is undergoing explosive growth in terms of the types and numbers of missions and systems being deployed. Through telecommunication satellites and the deployment of the international space station to future space tours and visits the use of launch facilities is being greatly expanded. For example, a number of satellite constellations for communication systems have been proposed or implemented. These constellations range from tens to hundreds of satellites. According to some estimates, the number of projected satellite launches in the next ten years alone will double the total number of satellites launched in the first forty years of space access. As a result of this activity, the capacity of existing launch facilities and launch vehicle construction facilities will be tested. It is apparent that efficient and lower cost operation of launch vehicles and launch facilities will be demanded.

Existing launch vehicles typically include one or more stages which function to boost a payload aboard the launch vehicle into space. Such stages are generally disposable. More specifically, when stages of launch vehicles, such as a first stage, are no longer needed, the stages are separated from the upper stage, if any, and the payload interconnected thereto and are allowed to fall back towards the ground or a body of water. If any portion of such a stage is reusable at all, substantial reconstruction is generally required. The disposable nature of launch vehicle stages can be an expensive Reusable spacecraft and stage systems have been proposed or implemented for some time. For example, the shuttles of the United States space shuttle fleet are reusable after re-entry and controlled landing upon inspection and some refurbishment. However, in order to achieve the velocities necessary for orbital insertion, the shuttles must utilize strap-on booster engines that are jettisoned during the launch process at considerable expense. Some existing or proposed systems are intended to permit recovery of launch vehicle stages such as by employing parachutes to soften splash down or landing. However, such systems entail a risk of significant damage, require substantial reconstruction of the stage after recovery and/or have achieved little or no commercial acceptance. Other proposed systems have contemplated the use of wings or other aerodynamic elements for retrieving boosters or stages. However, such systems may require substantial structural enhancement in connection with certain stage/tank structures and, in any event, it is apparent that such proposed systems have generally not achieved commercial acceptance.

SUMMARY OF THE INVENTION

The present invention is directed to a launch vehicle stage adapted for controlled aerodynamic descent back to a recovery area such as a specified landing area and an associated method of use. The invention makes use of stable stage structure, such as composite or aluminum isogrid construction, to support flight elements with minimal added mass. Through controlled descent, the stage can be recovered with minimal damage, potentially allowing for reuse with only routine refurbishment rather than full reconstruction. Moreover, the stage can be returned close to the launch site to shorten turn-around times between flights. In this manner, overall launch costs may be reduced and the capacity of launch facilities may be enhanced. Moreover, existing launch vehicle construction and handling resources can be freed for new launch vehicle construction.

According to one aspect of the present invention, a launch vehicle stage is provided with control surfaces for controlled aerodynamic descent. The launch vehicle stage is used to propel a payload system, such as a shuttle satellite and/or other space vehicle, towards an upper atmosphere or space trajectory or orbit. The launch vehicle stage includes: a booster system such as a solid or liquid phase rocket booster; a number of control surfaces structurally interconnected to the booster system; and a separation system for selectively separating the launch vehicle stage from the payload system. The booster is preferably structurally stable. That is, the booster is preferably constructed such that its outer skin assembly can support longitudinal and transverse loads even in the absence of substantial internal pressurization The control surfaces preferably include surfaces for controlling roll, pitch and yaw and for providing lift. In one embodiment, the control surfaces include wings, a tail, elevons, and canards. One or more of the control surfaces may be deployable between a retracted position for launch mode operation and an extended position for controlled descent mode operation. The separation system may include conventional, pneumatic, hydraulic or pyrotechnic elements for separation of the stage from the payload system on command or at a predetermined time, elevation, velocity or the like.

According to another aspect of the present invention, a launch vehicle stage is adapted for controlled flight based on command signals. The stage includes: a booster system; control surfaces, structurally interconnected to the booster system, that are moveable to control a course of descent of the stage; and a control system, operatively associated with the control surfaces, for receiving control signals concerning a desired maneuver of the stage and controlling the control surfaces based on the control signals to implement the desired maneuver. The stage may operate autonomously or by remote control. In this regard, the control system may receive the control signals from an onboard processor or the like, or may received the signals via stage-to-ground (and vice versa) telemetry. In either case, the control signals may be based at least in part on inputs from on-board or other instruments regarding current positional coordinates, attitude, altitude, velocity or other parameters.

According to another aspect of the present invention, a launch vehicle stage includes controlled flight systems and landing gear for controlled descent to a landing strip at a selected location, preferably close to launch facilities. The stage includes a booster system, a controllable aerodynamic flight system, and landing gear such as retractable wheels for substantially horizontal runway landings. The controlled aerodynamic flight system preferably includes at least two wings for providing lift sufficient for coasting or more preferably, sustained flight from a point of separation to the landing area and control surfaces for guidance to the landing area. The landing gear preferably includes wheel assemblies defining at least three points for landing and rolling to a stop. In one embodiment, a forward wheel assembly is retracted into a nose structure and two rear wheel assemblies are retracted into a fuselage structure during launch mode operation. The wheel assemblies are then deployed and locked into a fully extended position for landing. Such runway landing avoids damage and additional refurbishment or reconstruction that might otherwise be required in connection with skid landings or splash downs.

According to a still further aspect of the present invention, a propulsion system is provided for powered flight descent and recovery of a launch vehicle stage. The stage includes a booster system, a controllable flight aerodynamic system, and a propulsion system. The propulsion system may include one or more rocket engines or air breathing engines such as jet engines. Preferably, one or more jet engines are employed, thereby avoiding control complications associated with sloshing of substantial masses of liquid propellants. Conventional jet engines, such as fighter jet engines, may be employed. It will be appreciated that the associated power assist is useful in extending the glide path, or more preferably allowing for sustained flight, to a desired landing location. Such powered descent has particular advantages for retrieving stages after separation at high separation points (e.g., where the first stage of a multiple stage launch provides a significant portion of the total launch velocity) and where it is necessary for the stage to return at a substantial distance back to the launch location.

A method for using a launch vehicle stage in accordance with the present invention includes the steps of: providing a stage including a booster system and a controlled aerodynamic descent system, where the booster system is structurally stable so as to support aerodynamic and other loads; operating the booster system to provide a thrust to an associated payload system during launch mode operation; separating the stage system from the payload system after launch mode operation; and, after separation, operating the controlled aerodynamic descent system to control a course of descent of the stage to a landing area. The step of operating the controlled aerodynamic descent system may include monitoring the descent of the stage, receiving control signals, and deploying control surfaces of the controlled aerodynamic descent system to implement desired maneuvers. The method may further include the steps of operating a propulsion system to propel the stage along a trajectory towards the landing area.

BRIEF DESCRIPTION OF THE DRAWINGS

For a more complete understanding of the present invention and further advantages thereof, reference is now made to the following detailed description taken in conjunction with the drawings, in which.

DETAILED DESCRIPTION

In the following description, the invention is set forth in the context of a reusable first stage including propulsion and controlled descent systems. Although the following description therefore sets forth a particularly advantageous implementation of the present invention, it will be appreciated that various aspects of the reusable stage may vary from application to application in accordance with the present invention. For example, in the following description, an embodiment of the reusable stage is described which utilizes jet engines during controlled descent. This is particularly advantageous for first stage implementations or other implementations where an extended glide path or sustained flight may be desired. However, it will be appreciated that certain implementations, such as upper stage or other high separation point implementations, may allow for controlled aerodynamic descent of the reusable stage runway landings without propulsion. Similarly, although a number of possible configurations are set forth below for various types of conventional launch vehicles, it will be appreciated that other configurations may be utilized depending, for example, on the size and configuration of the launch vehicle, the mass of the payload, the desired orbit (high atmosphere, low earth orbit, geosynchronous orbit, or interplanetary trajectory), the number of boosters employed, and other factors.

Figure 1:
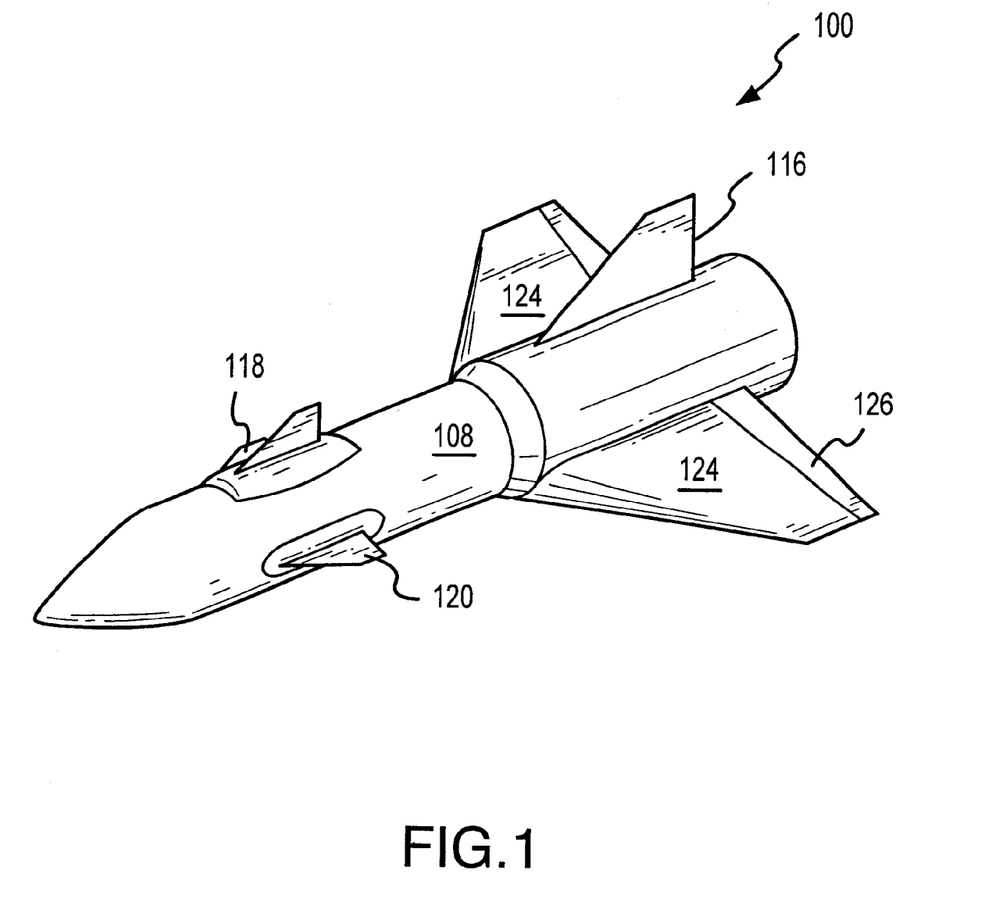
FIG. 1 is a perspective view of a reusable first stage in accordance with the present invention.
Figure 2:
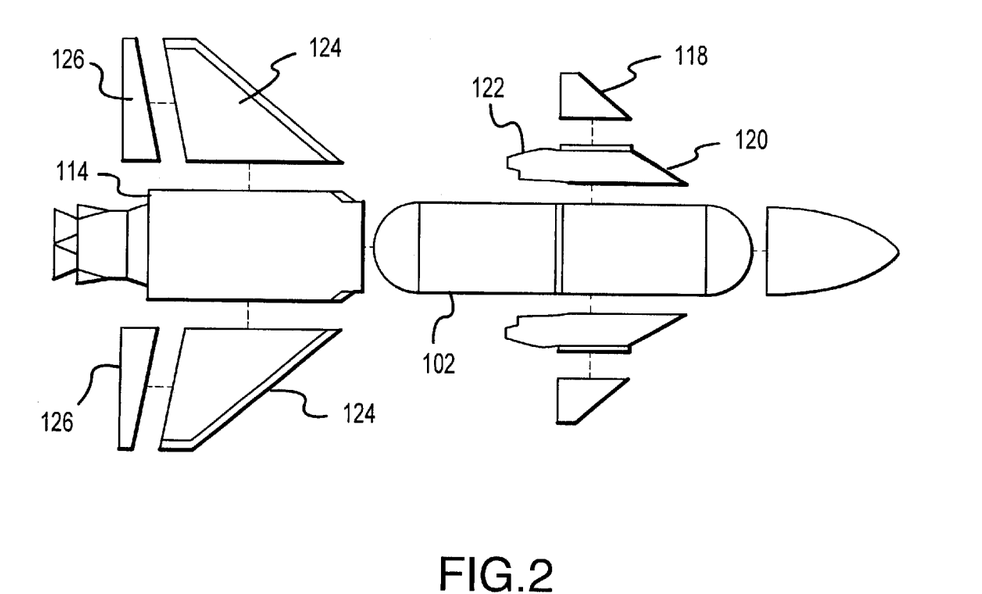
FIG. 2 is an exploded, top plan view of the reusable first stage of the FIG. 1.
Figure 3:
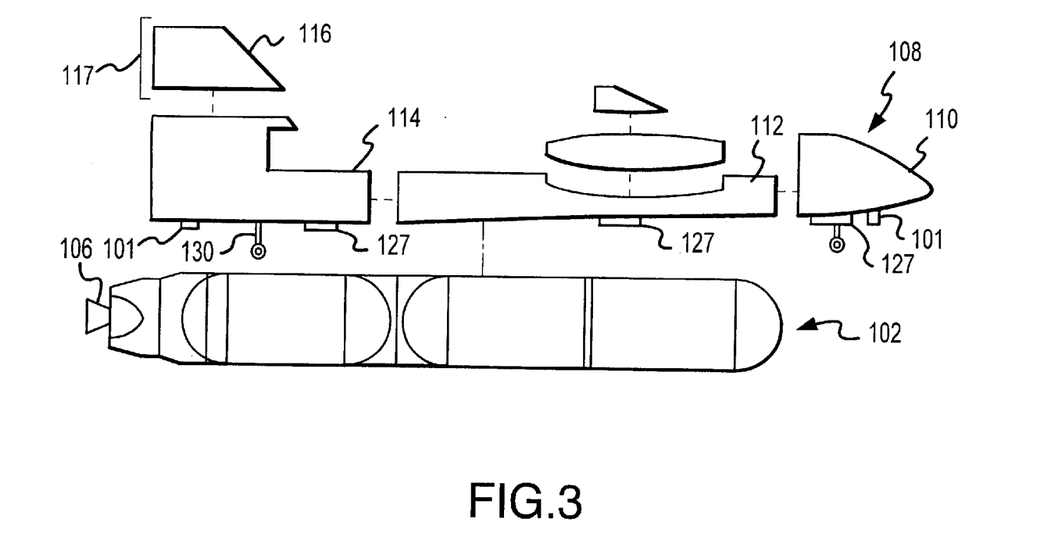
FIG. 3 is an exploded, side view of the reusable first stage of FIG. 1.

Referring to FIGS. 1–3, a reusable first stage is generally identified by the reference numeral 100. The stage 100 includes a booster engine system 102 for providing a thrust to the associated launch vehicle for propelling the launch vehicle towards a desired orbit. The illustrated thruster system 102 includes a number of propellant tanks 104 and an engine including nozzle 106 for expelling the propellants to generate thrust. For example, one of the tanks may include liquid oxygen and another tank may include any of various liquid rocket fuels. When the liquid rocket fuel contacts the liquid oxygen in the rocket engine combustion chamber, combustion occurs such that the propellants are discharged at high velocity through nozzle 106 to generate thrust. As will be understood from the description below, the illustrated booster system 102 may be any of various existing booster systems or other booster systems as may be developed. The illustrated system 102 may be, for example, an RD-180 engine marketed by Pratt & Whitney.

The illustrated booster system 102 has a structurally stable construction. That is, the outer layer or skin structure can support longitudinal and transverse loads even when the internal tank pressure is relieved. Such longitudinal loads may be experienced due to forward acceleration during launch and other longitudinal components of acceleration associated with vibrations and maneuvering. Transverse loads may be experienced in connection with controlled descent and associated lift and maneuvering forces. In this regard, each of the propellant tanks and other skin structures may include stringers or other reinforcing structure for strengthening the outer skin later. The illustrated skin structure is preferably an isogrid or othogrid structure formed from aluminum or other metal or a lightweight composite material. Such grid structures include ribs that extend both along the longitudinal axis of the booster system and circumferentially. Such ribs may be disposed at an angle to the longitudinal axis or a cross-sectional circumference rather than being aligned therewith.

The illustrated stage 100 also includes a structural assembly 108 for use in structurally interconnecting the booster system to the launch vehicle (until separation) and to the flight systems as will be described below. The structural assembly 108 includes a nose portion 110, a fairing portion 112 and a fuselage shell 114. The nose portion 110 is shaped to provide for improved aerodynamic performance, e.g., reduce drag, during both launch mode and controlled descent mode operation. In addition, the nose portion 110 houses retractable landing gear prior to landing as will be described below. The nose portion may also provide heat shielding and house various instruments.

The fairing portion 112 and fuselage shell 114 house the booster system 102 and provide additional support for aerodynamic structure used in controlled descent. It will be appreciated that the structural assembly 108 should be lightweight while providing sufficient structural support to sustain substantial acceleration associated with launch, separation and controlled descent and landing. In this regard, the structural assembly 108 may be constructed from aluminum or lightweight alloys or composite materials, and is preferably constructed using known aerospace techniques for minimizing mass. In this regard, the structural assembly 108 may be fabricated from a grid material as discussed above or otherwise include strengthening ribs or stringers. The fuselage shell 114 also houses additional landing gear prior to deployment for landing.

The reusable first stage 100 preferably includes aerodynamic structure for controlled descent to a desired landing area. In this regard, the aerodynamic structure preferably includes elements for providing lift sufficient to support the stage on a desired flight or glide path and control surfaces for controlling the roll, pitch and yaw of the stage so as to guide the stage to the desired landing area. In the illustrated embodiment, the reusable first stage includes a vertical tail 116. The illustrated tail 116 is sufficient in size to provide the desired yaw control and prevent or allow recovery from any flat spin of the stage. In this regard, the illustrated tail 116 includes a rudder surface 117 that is rotatable about a vertical axis for yaw control.

The illustrated reusable first stage 100 also includes canards 118 and nacelles 120 extending from the fairing section 112. The nacelles 120 house jet engines 122 used for powered flight during descent. It will be appreciated that such powered flight can extend the flight path as is particularly useful in returning the first stage to a landing area proximate to the launch facility so as to reduce turn-around times between flights. It will be appreciated that various types of propulsion systems including rocket propulsion systems may be utilized in accordance with the present invention. However, rocket propulsion systems may introduce certain control complications due to substantial masses of sloshing propellants. Accordingly, in the illustrated embodiment, jet engines 122 are utilized. Specifically, a pair of jet engines are located on opposite sides of the fairing portion 112. The pair of engines provides the desired propulsion power and also provides a degree of redundancy in the event of engine failure. The illustrated engines, 122 are Pratt and Whitney 229 jet engines which may be upgraded for optimal thrust and performance. Advantageously, a common liquid fuel, such as RP or JP and may be utilized to operate both the rocket engines of the thruster system 102 and the jet engines 122.

The canards 118 provide lift and also serve to move the center of lift forward relative to the overall structure of the reusable first stage 100. The canards 118 may be deployable, e.g., rotatable about a horizontal axis, for supplemental pitch control. In addition, the illustrated canards 118 are pivotable relative to an axis where the canards 118 are attached to the nacelles 120 such that the canards 118 can be pivoted upward or downward relative to the structural assembly 108. Such pivoting provides for enhance subsonic and supersonic control.

The illustrated stage 100 also includes a pair of wings 124 which are the primary lifting surfaces of the stage 100. It will be appreciated that the size and configuration of the wings may be selected based on a variety of lift related factors such as anticipated maximum speed and elevation, required landing speed, the anticipated mass of the stage 100, and other factors. The illustrated wings 124 have a swept profile for reduced drag and enhanced high speed performance. The wings 124 also include elevons 126 at the trailing edges thereof for pitch and roll control. In this regard, the elevons 126 are separately or collectively pivotable about a substantially horizontal axis. In this regard, the elevons can be operated in unison for pitch control like conventional elevators/stabilizers and can be operated separately for roll control like conventional wing flaps.

In order to allow for runway landings, the stage 100 includes landing gear 130. As illustrated, the landing gear 130 is retractable, e.g., using conventional hydraulics or other actuators, between a stowed position and a deployed position. In this regard, the landing gear 130 may be stowed within the nose section 110 and the fuselage shell 114 during launch mode and during an initial portion of the descent mode for reduced drag. The landing gear 130 can then be deployed to a fully extended position for landing. Also shown in FIG. 3 are separation assemblies 127 that allow for structural interconnection of the stage 100 to a launch vehicle during launch and then allow for selective separation when the first stage is fully used. Any conventional separation assemblies may be used in this regard such as, for example, pyrotechnic separation units employing explosive bolts. The stage 100 also includes attitude control systems 101 for controlling the attitude of the stage 100 at high altitudes where aerodynamic control surfaces have limited, if any, effectiveness. The attitude control systems 101 may include small rockets aligned on various axes that can be pulsed to achieve a desired attitude for deceleration and thermal control.

Figure 4:
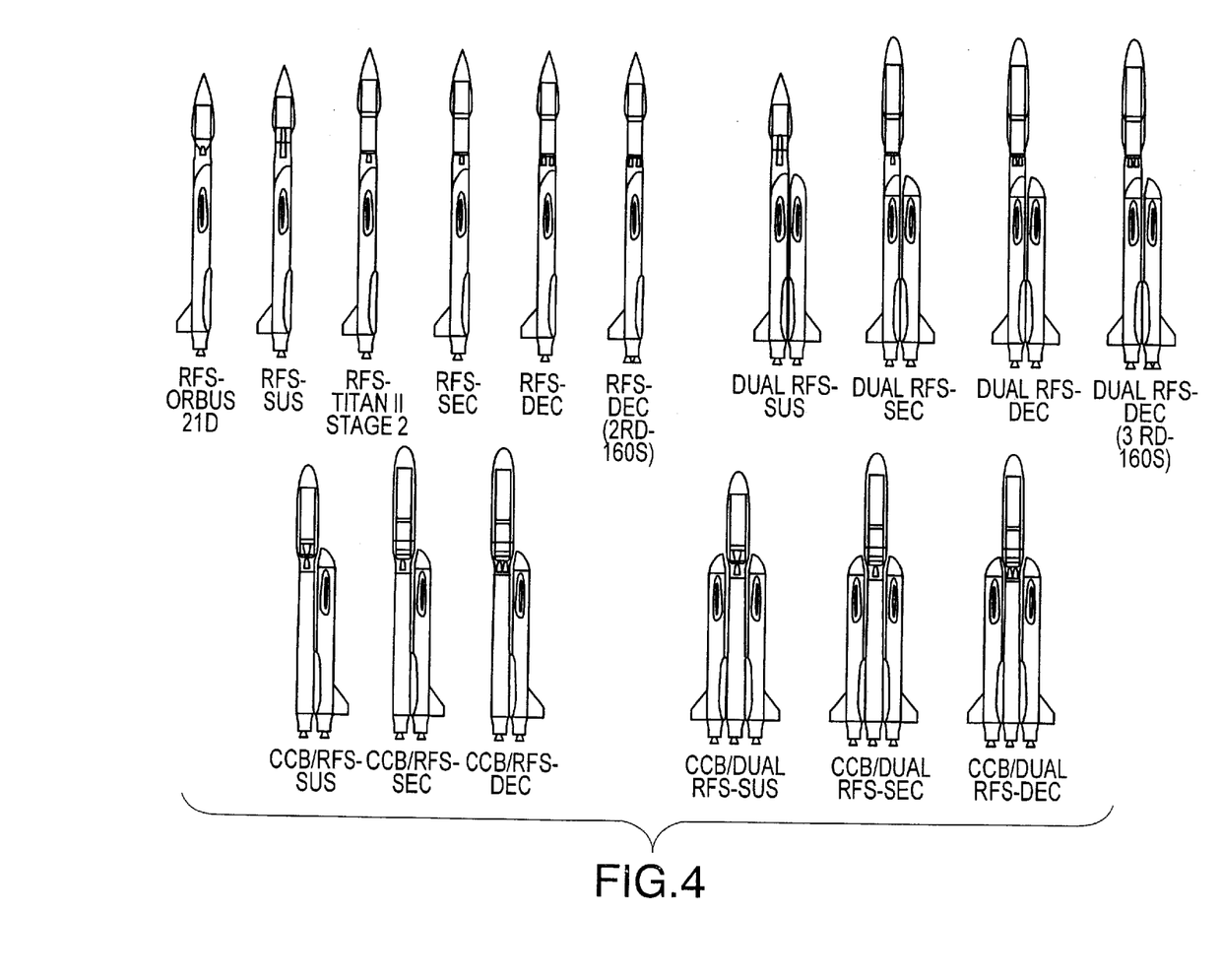
FIG. 4 illustrates a number of different configurations of one or more reusable stages interconnected to a launch vehicle and payload system in accordance with the present invention.

FIG. 4 illustrates various configurations for using the reusable first stage in connection with conventional launch vehicles. As shown, the reusable first stage may be used as a single first stage booster or in pairs or in larger groupings as may be desired for particular applications. Also, as can be observed from FIG. 4, one or more reusable first stage boosters may be used in combination with conventional disposable boosters where the launch vehicle configuration or other considerations so warrant. Finally, it will also be observed that the reusable first stage can be used in a variety of applications involving different payload vehicles and can be used with or without additional stages to reach orbit.

Figure 5:
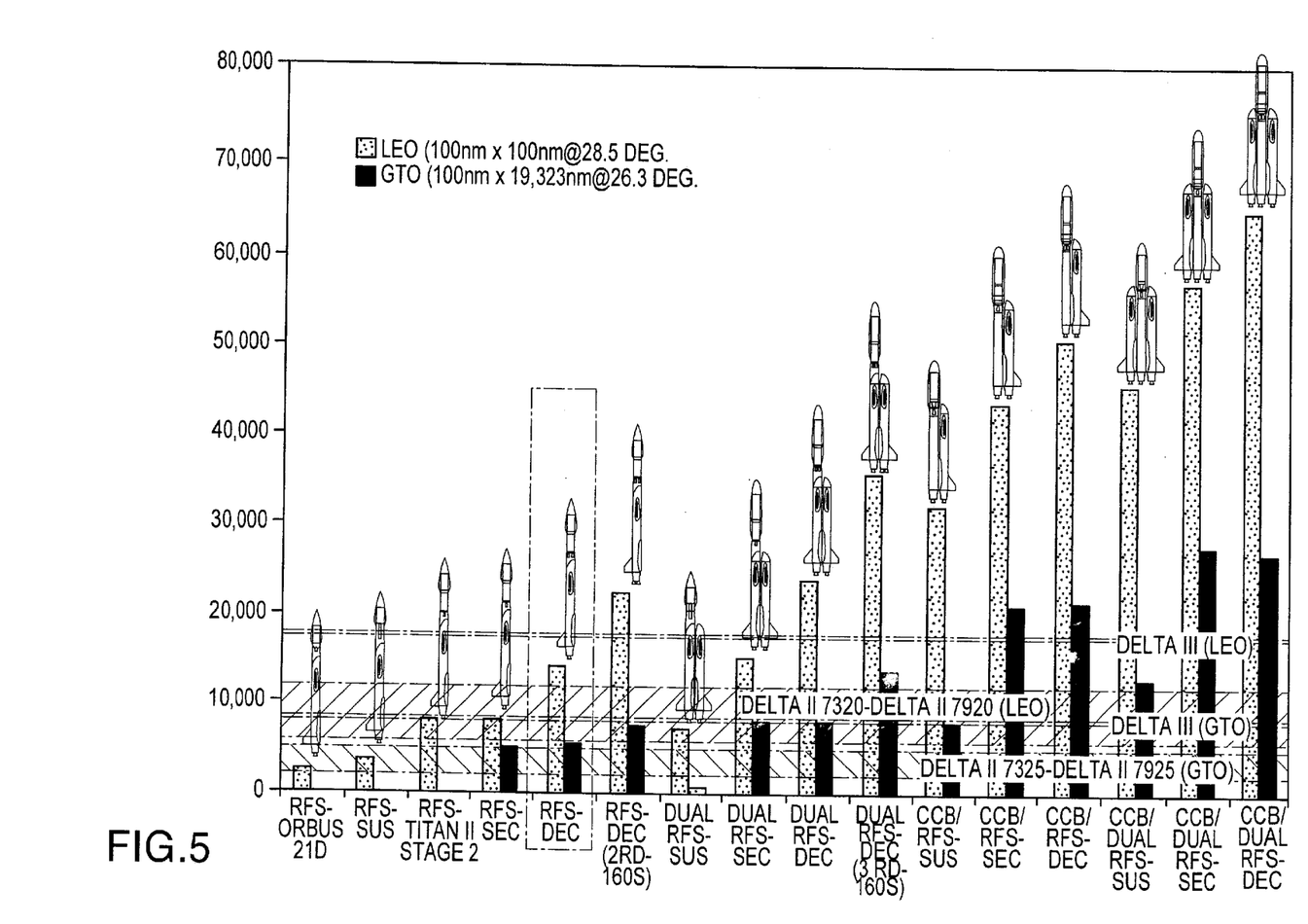
FIG. 5 is a chart illustrating the performance of various launch vehicles utilizing one or more stages in accordance with the present invention.

FIG. 5 illustrates the expected performance of the various launch vehicle configurations using the reusable first stage in accordance with the present invention. It will be observed that the configurations shown in FIG. 5 generally correspond to the configurations identified in FIG. 4. The performance is shown in this case in relation to a conventional Delta III rocket for delivering a payload to low earth orbit. It will thus be observed that the reusable first stage of the present invention can be used in a variety of applications by reconfiguring the launch vehicles. Also, it will be observed that the reusable first stage of the present invention can be readily implemented in a variety of conventional launch vehicle applications thereby substantially reducing development costs and enabling the benefits of the present invention to be immediately realized.

Figure 6:
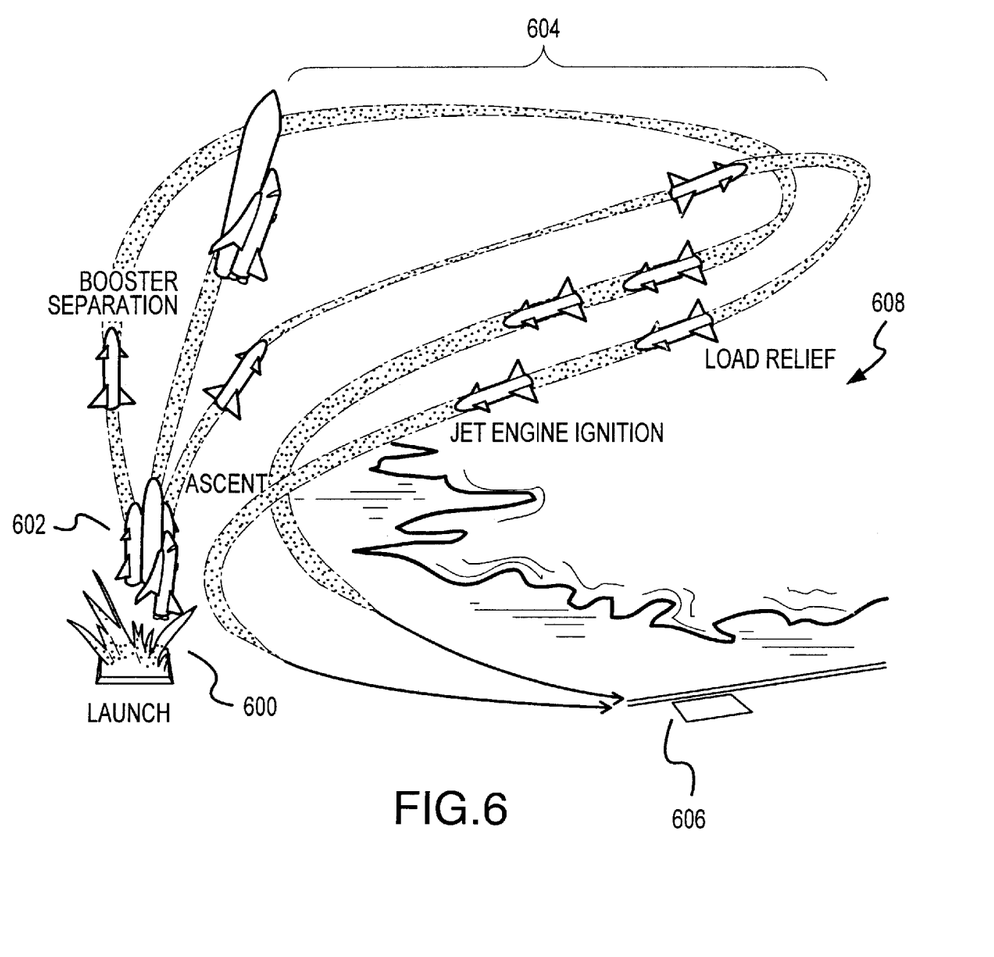
FIG. 6 illustrates a launch and flight path of a launch vehicle and stage in accordance with the present invention.

FIG. 6 illustrates an overall flight path of a launch vehicle utilizing multiple reusable first stage boosters in accordance with the present invention. In the illustrated example, the reusable first stage boosters are used in launching a space shuttle which also utilizes a disposable propellant tank. As shown, the launch vehicle is launched from a launch facility 600. The launch vehicle then ascends towards orbit under thrust from the two reusable first stage boosters as well as the common core booster. A separation of the reusable first stage boosters from the launch vehicles happens approximately at the separation point 602. That is, at separation point 602, the separation system is activated to detach each of the reusable first stage boosters from the launch vehicle. The separation point 602 may be selected at a particular elevation, at a particular velocity, or to occur at a certain time after liftoff. Generally, the separation point 602 will generally coincide with near depletion of the propellant tanks of the reusable first stage boosters.

Due to momentum and any continuing rocket burn, the reusable first stage boosters will ascend for some time after separation. This ascending portion of the flight path is generally indicated at 604. During this ascending portion 604 of the flight path, the attitude control system of the reusable first stage may be activated to control the attitude of the reusable first stage and to guide the reusable first stage along a path selected to facilitate return of the reusable first stage to a landing strip 606 proximate to the launch facility 600. It will be understood that returning the reusable first stage to a landing strip 606 close to the launch facility may be reduce turn-around times between missions. During the ascending portion 604 of the flight path, the attitude of the reusable first stage may be selected to help slow the reusable first stage to subsonic speeds as may be desired for overflying populated areas. Also, the various control surfaces may be utilized (if effective) to manage elevation and stage positioning so as to minimize the amount of fuel that is required to guide the stage back to the landing strip 606.

In the illustrated flight path, the reusable first stages turn back towards the launch facility 600 close to the top of the ascending portion 604 of the flight path. At this time, it may be desirable to minimize the load carried by the reusable first stage in order to reduce the required landing speed and otherwise facilitate landing. For example, any excess propellants or other expendable elements may be discharged at this time for splashdown or landing in a secured area. Depending on the particular application, a jet engine ignition may occur at some time during the ensuing descending portion 608 of the flight path. The timing of jet engine ignition (if necessary) will depend on a variety of factors including the elevation of the separation point 602, the length of the flight path back to the landing strip 606, the rate of descent, atmospheric conditions, etc. In this regard, it will be appreciated that various flight parameters may be monitored to control the flight path, the operation of the jet engines and the operation of the control surfaces. On-board instruments may measure effective travel speed, elevation, the location coordinates of the stage, the attitude of the stage, and the positions of the deployable control surfaces. Readings from these instruments may be reported to an on-board processor for autonomous control of the landing approach. Alternatively, readings from these instruments may be reported to a ground based control station which in turn controls operation of the jet engine and control surfaces via control commands transmitted to the stage.

Upon approaching the landing strip 606, for example, and upon reaching a defined elevation, the landing gear may be deployed from its stowed position to a fully extended position for landing. Finally, upon touchdown, the reusable stage may be allowed to roll to a stop or may be actively slowed by reversing the jet engines, deploying parachutes, or employing other braking systems.

Figure 7:
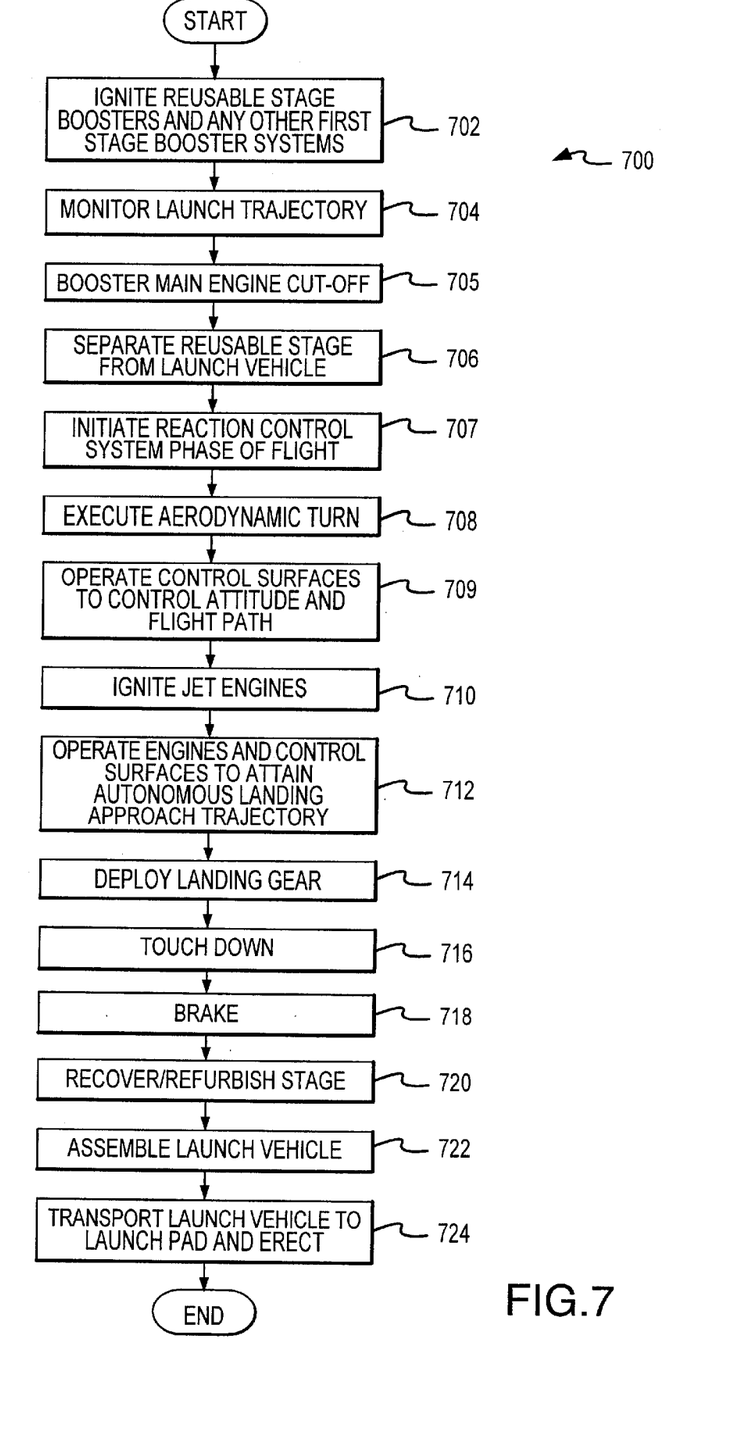
FIG. 7 is a flowchart illustrating a process of reusing reusable stage in accordance with the present invention.

FIG. 7 is a flow chart providing a summary of a process for using the reusable first stage. The process 700 is initiated by igniting (702) the reusable stages and any other booster systems to launch the launch vehicle and payload. After launch, the launch trajectory is monitored (704) to identify the first stage separation point. For example, the separation point may be identified based on elapsed time, elevation, velocity or other parameters. Upon identification of the separation point, booster main engine cut-off (705) is actuated and the reusable stage is separated (706) from the launch vehicle, for example, by activating a pyrotechnic separation system. After separation, the reaction control system phase of flight is initiated (707), and the reaction control system is utilized to execute (708) an aerodynamic twin. Initiation of the reaction control system transfers control of the stage from the gimbal structure of the main thruster engine, which executes maneuvers by thrust vectoring, to the reaction control orbital maneuvering system that controls attitude by pulsing attitude control rockets. As noted above, this system provides attitude control where the atmosphere is too thin for effective control surface operation. The attitude control system and/or control surfaces of the first stage may then be operated (709) after separation to control the attitude and flight path of the stage.

At some point after separation, depending on the particular application, the jet engines may be ignited (710). The engines can then be operated (712) in conjunction with the control surfaces to attain an autonomous landing approach trajectory. Before landing, the landing gear is deployed (714) and the stage can then touch down (716) and brake (718) to a stop. The stage can then be recovered (720) and refurbished. Due to the controlled descent and runway landing of the reusable stage, it is anticipated that the stage may be reused with only routine refurbishing. Such refurbishing may involve inspecting the stage for any heat or other damage, as well as normal preflight testing for leaks and safety systems. Once the stage is cleared for flight, the stage can be assembled (722) into a launch vehicle. The launch vehicle is then transported (724) to the launch pad, erected and attached to a launch tower with appropriate umbilical cords. The process for using the stage may then be repeated many times before the reusable stage is retired.

While various embodiments of the present invention have been described in detail, it is apparent that further modifications and adaptations of the invention will occur to those skilled in the art. However, it is to be expressly understood that such modifications and adaptations are within the spirit and scope of the present invention.

What is claimed is:

1. A reusable apparatus for thrusting a space vehicle in an air environment towards orbit, comprising:

a rocket stage system for providing a thrust to said space vehicle, said rocket stage system including a propellant tank having reinforcement members associated with an outer skin assembly thereof for supporting aerodynamic loads; and an aerodynamic control system for allowing controlled aerodynamic descent of said stage system, said aerodynamic control system including a plurality of control surfaces, said control surfaces being deployable for guidance of said rocket stage system during said controlled aerodynamic descent, wherein said control system comprises wings and a pair of canards.

2. A reusable apparatus as set forth in claim 1, wherein said reinforcement members extend longitudinally along said propellant tank for supporting aerodynamic loads associated with forward acceleration.

3. A reusable apparatus as set forth in claim 1, wherein said reinforcement members extend circumferentially for supporting transverse aerodynamic loads.

4. A reusable apparatus as set forth in claim 1, wherein said reinforcement members form part of an aerospace grid structure.

5. A reusable apparatus as set forth in claim 1, wherein said descent control system comprises deployable control surfaces for pitch control.

6. A reusable apparatus as set forth in claim 1, wherein said pitch control system comprises deployable control surfaces for attitude control.

7. A reusable apparatus as set forth in claim 1, wherein said pitch control system comprises deployable control surfaces for roll control.

8. A reusable apparatus as set forth in claim 1 wherein each of said canards are rotatable about a central axis thereof for pitch control.

9. A reusable apparatus as set forth in claim 1 wherein each of said canards is rotatable about a transverse axis transverse to a central axis thereof for improved subsonic and supersonic performance.

10. A reusable apparatus as set forth in claim 1, further comprising retractable landing gear for landing strip landings.

11. A reusable apparatus as set forth in claim 1, further comprising a propulsion system for propelled flight during descent.

12. A reusable apparatus as set forth in claim 11, wherein said propulsion system comprises at least one jet engine.

13. A reusable apparatus as set forth in claim 11, wherein said jet engine uses a fuel that is the same as that used by said rocket stage system for launching.

14. A reusable apparatus for thrusting a space vehicle in an air enjoinment towards orbit, comprising:
　a rocket stage system for providing a thrust to said space vehicle, said rocket stage system including a propellant tank having reinforcement members associated with an outer skin assembly thereof for supporting aerodynamic loads;
　a descent control system for controlling descent of said rocket stage system towards earth, said control system being operative for processing control signals concerning said descent of said rocket stage system and controlling a course of said descent based on said control signals, whereby said descent is controlled to facilitate retrieval and reuse of said stage system; and
　a propulsion system for propelled flight during descent.

15. A reusable apparatus as set forth in claim 14, wherein said descent control system comprises deployable control surfaces for pitch control.

16. A reusable apparatus as set forth in claim 14, wherein said control system comprises a pair of canards.

17. A reusable apparatus as set forth in claim 16, wherein each of said canards is rotatable about a transverse axis transverse to a central axis thereof for improved subsonic and supersonic performance.

18. A reusable apparatus as set forth in claim 14, further comprising retractable landing gear for landing strip landings.

19. A reusable apparatus for thrusting a space vehicle in an air environment towards orbit, comprising:
　a rocket stage system for providing a thrust to said space vehicle, said rocket stage system including a propellant tank having a wall formed from an aerospace grid structure, said aerospace grid structure comprising one of an isogrid and an orthogrid; and
　an aerodynamic control system including a plurality of control surfaces for allowing controlled aerodynamic descent of said stage system, said control system being deployable for guidance of said rocket stage during said controlled aerodynamic descent;
　wherein said aerospace grid structure assists in supported flight related forces during said controlled aerodynamic descent.

\* \* \* \* \*